United States Patent [19]
Takahashi et al.

[11] 3,770,258
[45] Nov. 6, 1973

[54] OIL DAMPER FOR VEHICLES

[75] Inventors: Noriyuki Takahashi, Tokyo; Hidehiko Inoue, Saintama; Yoshihiko Toshimitsu, Tokyo, all of Japan

[73] Assignee: Honda Giken Kogyo Kabushiki Kaisha, Tokyo, Japan

[22] Filed: Apr. 26, 1972

[21] Appl. No.: 247,709

[30] Foreign Application Priority Data
Apr. 30, 1971 Japan.................................. 46/28734

[52] U.S. Cl...................... 267/35, 188/298, 188/314
[51] Int. Cl............................................. B60g 11/62
[58] Field of Search.................... 188/298, 314, 321; 267/35; 248/22

[56] References Cited
UNITED STATES PATENTS

| | | | |
|---|---|---|---|
| 1,121,547 | 12/1914 | Barber | 188/314 |
| 3,482,829 | 12/1969 | Kidby | 267/35 |
| 3,658,314 | 4/1972 | Luzsicza | 267/35 X |

*Primary Examiner*—George E. A. Halvosa
*Attorney*—Eric H. Waters et al.

[57] ABSTRACT

An oil damper for vehicles comprises a closed chamber supported by a body structure of the vehicle, the wall of which chamber is partially formed with an elastic body, such as a rubber disc, and a longitudinally expansible and contractible cylinder with a piston rod, one end of which is connected to the elastic body while the other end thereof is connected to a wheel suspension means of the vehicle. Oil is filled into the chamber and the cylinder, to flow between them through a conduit or hole in the piston, in accordance with the longitudinal expansive and contractive motion of the cylinder.

6 Claims, 2 Drawing Figures

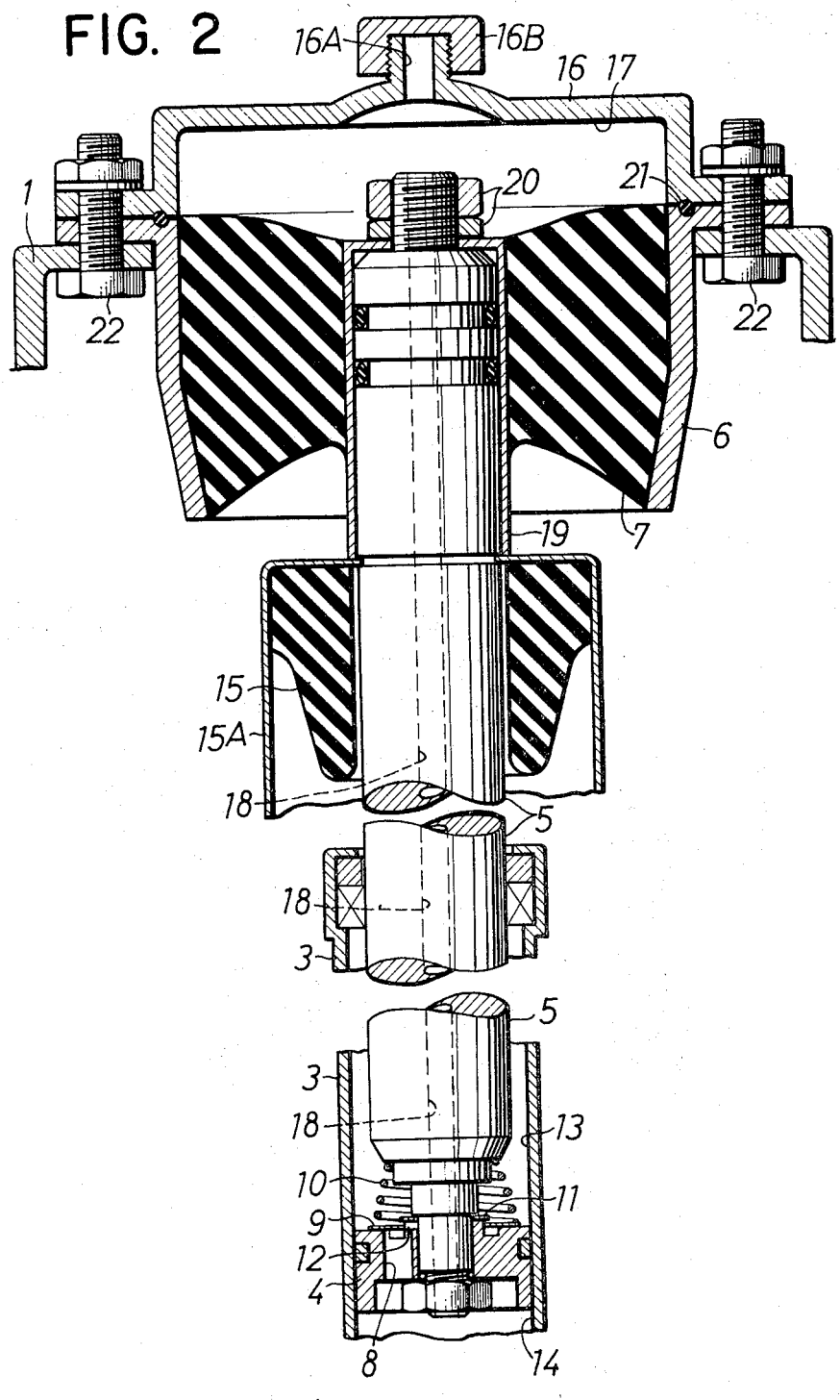

OIL DAMPER FOR VEHICLES

BRIEF SUMMARY OF THE INVENTION

The present invention relates to an oil damper for vehicles, such as motor cars, to be attached between a body structure of the vehicle and a wheel suspension means thereof.

It is known that in a damping device supported between the body structure and the wheel suspension of a vehicle, an elastic body is usually interposed between the oil damper and the body structure for lateral swing damping between them.

But such a device is inadequate for damping the swing of the oil damper itself.

Therefore, one object of the present invention is to provide an oil damper for vehicles, the swing of which is adequately damped by an elastic body between a longitudinally expansible and contractible member of the oil damper, e.g. a cylinder and the body structure of the vehicle.

Another object of the present invention is to provide an oil damper which does not need particular spring means, or needs just a weak spring means if needed, for damping the swing of the expansible and contractible member of the oil damper.

A further object of the present invention is to provide an oil damper in which a closed space is filled up with the oil, without contact with the atmosphere, whereby the quality of the oil is never deteriorated.

A still further object of the present invention is to provide an oil damper for vehicles which is simple in structure and is outstanding in its useful effect.

BRIEF DESCRIPTION OF THE DRAWING

FIG. 2 is a partial enlarged cross-sectional view of the structural details in the inventive oil damper as generally shown in FIG. 1.

DESCRIPTION OF THE PREFERRED EMBODIMENT

Figure 1:
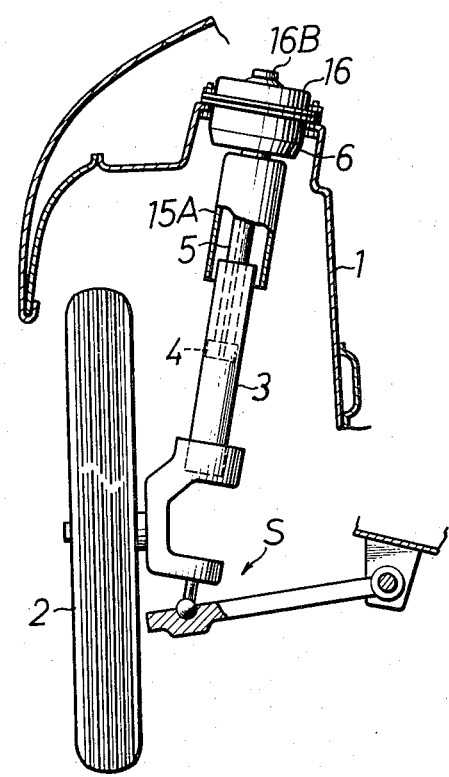
FIG. 1 is a partly cross-sectional elevation illustrating a preferred embodiment of the present invention, with an oil damper between a body structure and a wheel suspension means of a vehicle.

Referring to FIGS. 1 and 2, an oil cylinder 3 under a body structure 1 of a vehicle is connected at its lowermost portion to a means S suspending a wheel 2. A piston 4 having a rod 5 is set slidably along the inner surface of the cylinder 3. The free end portion of the rod 5 has thereon a cover 19 which is fixed to an end portion of the rod 5 with a nut 20.

The central portion of a circular elastic body 7 such as a rubber disc is applied to the circumferencial outer surface of the cover 19, while the circumferencial outer surface of the elastic body 7 is applied to the inner surface of a circular casing 6 fixed to the body structure 1 with conventional means 22 such as bolts and nuts.

The thickness of the elastic body 7 gradually increases from the central portion to the outer portion thereof as shown in FIG. 2.

The piston 4 has a hole or passage 8 covered with a circular disc valve 9 which is set between the upper surface of the piston 4 and a stopper 11 fixed to the rod 5 to maintain a narrow gap 12 between the valve 9 and the piston 4. The valve 9 is normally biased downwards by a coil spring 10 set between the valve 9 and the rod 5.

The inner closed space of the cylinder 3 is divided by the piston into two chambers or compartments, an upper compartment 13 and a lower compartment 14.

Near the lowermost portion of the end cover 19, another elastic body 15 is fixed to the circumferencial outer surface of the rod 5 with a cover 15A so that it forms an upper-limit stopper against sudden movements of the cylinder 3.

A cover 16 having an oil supply hole 16A and a cap 16B may be fixed to the body structure 1 with the fixing means 22, to form a closed chamber 17 with the upper surface of the elastic body 7. The hole 16A of the cover 16 is convenient for supplying oil to the closed chamber 17.

The chamber 17 is entirely closed by using an O-ring 21 between the cover 16 and the casing 6.

The rod 5 has an axial hole 18 so that the closed chamber 17 is connected with the lower compartment 14 of the cylinder 3 through the hole 18.

The closed chamber 17, the hole 18, the lower and the upper compartment 14, 13 are filled up with oil.

When the load of the vehicle body increases, it is transmitted to the piston 4 through the elastic body 7 and the rod 5, to move the piston 4 downwards toward the cylinder 3. Therefore, oil in the lower chamber 14 is compressed to flow into the upper chamber 13 through the passage 8, and into the closed chamber 17 through the hole 18, because the rate of decrease in the volume of the lower chamber 14 is higher than the increase in volume of the upper chamber 13.

Thus, the body 7 elastically accepts the compressed oil in the closed chamber 17.

When the load of the vehicle body decreases, the piston 4 is pulled upwards with respect to the cylinder 3. Accordingly, the pressure of the oil in the lower compartment 14 is decreased, to suck out oil from the chamber 17 through the hole 18 with the aid of the elastic body 7, and in the upper compartment 13 through the narrow gap 12.

Thus, the swing of the body of the vehicle is smoothly and elastically damped by the described inventive oil damper. The variation of thickness of the elastic body 7 is effective for damping the swing between the body structure 1 of the vehicle and the oil damper connected to the wheel suspension S.

What is claimed is:

1. An oil damper for vehicles, comprising: a closed chamber (17) supported by a body structure (1) of the vehicle, the latter also including suspension means (S) for a wheel (2); said chamber being formed with an elastic body (7) which has a central portion and a circumferential outer portion; said elastic body being surrounded by a casing (6); a longitudinally expansible and contractible oil cylinder (3) including a piston and piston rod (4/5) with a substantially axial hole (18) therethrough, interconnecting said chamber with said cylinder, and a cover (19) partly surrounding a portion (5) of said piston rod; the piston dividing the inner space of said cylinder into two compartments (13, 14), with a valve (9) acting therebetween; said chamber, said axial hole and said compartments of the cylinder being adapted to be filled up with oil which contacts said elastic body within said chamber; and means preventing the oil to get into contact with the outside atmosphere; wherein respective ends of said piston rod and cylinder are connected to said body structure and to said suspension means; said cylinder is in communication with said chamber through said axial hole; said elastic body is applied to the outer surface of said cover; and wherein the thickness of said elastic body gradually increases from said central portion to said outer portion, so that the oil is free to flow between said chamber and said cylinder in accordance with the longitudinal expansive and contractive motion of the latter.

2. The oil damper as defined in claim 1, further comprising an end cover (16) for said chamber (17), an oil-supply hole (16A) in said end cover, and a removable cap (16B) thereon.

3. The oil damper as defined in claim 1, wherein, during the flow of the oil from said cylinder (3) towards said chamber (17), results in a higher rate of decrease in volume of one (14) of said compartments, which is further away from said chamber, than the increase in volume in another (13) of said compartments, which is closer to said chamber.

4. The oil damper as defined in claim 1, wherein said piston (4) is provided with a passage (8), and is covered with a disc (9) constituting said valve, to produce a narrow gap (12) with respect to said piston, and biasing means (10) acting between said disc and one end of said piston portion (5).

5. The oil damper as defined in claim 1, further comprising an elastic member (15) fixed to the outer surface of said piston rod portion (5) to form a stop against sudden movements of said cylinder (3).

6. The oil damper as defined in claim 5, further comprising a cover (15A) below said piston portion (5), substantially surrounding and protecting said elastic member (15) and a terminal portion of said cylinder (3).

* * * * *